United States Patent
Kim et al.

(10) Patent No.: US 10,645,960 B2
(45) Date of Patent: May 12, 2020

(54) FOOD PROCESSING APPARATUS AND FOOD MANUFACTURING METHOD USING THE SAME

(71) Applicant: CJ Cheiljedang Corporation, Seoul (KR)

(72) Inventors: Myung Ho Kim, Busan (KR); Jung Seo Park, Seoul (KR); Joo Dong Park, Gyeonggi-do (KR); Hyun Woong Park, Gyeonggi-do (KR); Tae Hum Back, Seoul (KR); Dong Jin Lee, Gyeonggi-do (KR); Su Yeon Chung, Seoul (KR); Sang Goo Yun, Gyeonggi-do (KR); Chang Yong Lee, Gyeonggi-do (KR)

(73) Assignee: CJ CHEILJEDANG CORPORATION, Seoul (JP)

( * ) Notice: Subject to any disclaimer, the term of this patent is extended or adjusted under 35 U.S.C. 154(b) by 224 days.

(21) Appl. No.: 15/546,620

(22) PCT Filed: Feb. 4, 2016

(86) PCT No.: PCT/KR2016/001210
§ 371 (c)(1),
(2) Date: Jul. 26, 2017

(87) PCT Pub. No.: WO2016/133303
PCT Pub. Date: Aug. 25, 2016

(65) Prior Publication Data
US 2018/0271124 A1 Sep. 27, 2018

(30) Foreign Application Priority Data

Feb. 16, 2015 (KR) .......................... 10-2015-0023431

(51) Int. Cl.
*A23P 20/10* (2016.01)
*A23P 20/15* (2016.01)
(Continued)

(52) U.S. Cl.
CPC ................. *A23L 7/122* (2016.08); *A23L 7/13* (2016.08); *A23L 17/60* (2016.08); *A23P 20/11* (2016.08); *A23P 20/20* (2016.08); *A23V 2002/00* (2013.01)

(58) Field of Classification Search
CPC .......... A23P 20/00–18; A23L 7/117–13; A23L 17/60; A23L 19/18
See application file for complete search history.

(56) References Cited

U.S. PATENT DOCUMENTS 3,703,382 A * 11/1972 Harkey ................... A23P 20/12
426/293
5,525,366 A 6/1996 Zukerman et al.
(Continued)

FOREIGN PATENT DOCUMENTS

CN 201282162 Y 7/2009
CN 201439257 U 4/2010
(Continued)

OTHER PUBLICATIONS

International Search Report, dated Jul. 1, 2016, 2 pages (English Translation), PCT/KR2016/001210.
(Continued)

*Primary Examiner* — Michael A Laflame, Jr.
(74) *Attorney, Agent, or Firm* — Adsero IP

(57) ABSTRACT

The present invention relates to a food processing apparatus that is capable of supplying two different kinds of food materials and sequentially performing manufacturing processes such as bonding and cutting on the single apparatus, thus allowing the food to be easily processed.

12 Claims, 14 Drawing Sheets

(51) Int. Cl.
*A23L 7/122* (2016.01)
*A23L 17/60* (2016.01)
*A23P 20/20* (2016.01)
*A23L 7/13* (2016.01)

(56) References Cited

U.S. PATENT DOCUMENTS

| | | | | |
|---|---|---|---|---|
| 6,004,612 | A * | 12/1999 | Andreski | A21C 15/02 |
| | | | | 426/450 |
| 6,412,397 | B1 | 7/2002 | McNeel et al. | |
| 2007/0231425 | A1 * | 10/2007 | Ream | A23G 3/0021 |
| | | | | 426/3 |
| 2012/0196005 | A1 * | 8/2012 | Pickford | A23L 3/36 |
| | | | | 426/96 |
| 2014/0170291 | A1 | 6/2014 | Chung et al. | |
| 2016/0157675 | A1 * | 6/2016 | Gvozdanovic | A47J 37/1233 |
| | | | | 426/231 |
| 2018/0271124 | A1 * | 9/2018 | Kim | A23L 17/60 |

FOREIGN PATENT DOCUMENTS

| | | |
|---|---|---|
| JP | 2000-232854 A | 8/2000 |
| JP | 2007-099482 A | 4/2007 |
| KR | 10-2000-0065416 A | 10/2002 |
| KR | 10-0808507 B1 | 2/2008 |
| KR | 2009-0082614 A | 7/2009 |
| KR | 10-0954434 B1 | 4/2010 |
| KR | 10-2013-0047178 A | 7/2013 |
| KR | 10-1465999 B1 | 11/2014 |
| KR | 10-1466001 B | 11/2014 |
| KR | 10-2014-0137696 A | 12/2014 |

OTHER PUBLICATIONS

International Search Report, dated Jul. 1, 2016, 2 pages (English Translation).
Japanese Office Action, dated Feb. 7, 2019, (JP Appl. No. 2017-562662) based on PCT-KR2016-001210, 5 pages.
Russian Office Action, dated Jan. 24, 2019, (RU Appl. No. 2017-132287) based on PCT-KR2016-001210, 11 pages.
Japanese $1^{st}$ Office Action dated Aug. 23, 2018, (JP Appl. No. 2017-562662) based on PCT-KR2016-001210, 5 pages.
First Office Action, dated Mar. 20, 2018, NZ Application No. 734067, 3 pages.
Search Report dated Jun. 28, 2018 with regard to the corresponding European application No. 16752633.4, 7 pages.
Certificate of Correction for U.S. Pat. No. 5,525,366A, dated Oct. 22, 1996, 2 pages.
Chinese Office Action, Chinese Application No. 2016-80009402.5, dated Feb. 25, 2020, 10 pages.

* cited by examiner

[Fig. 1]
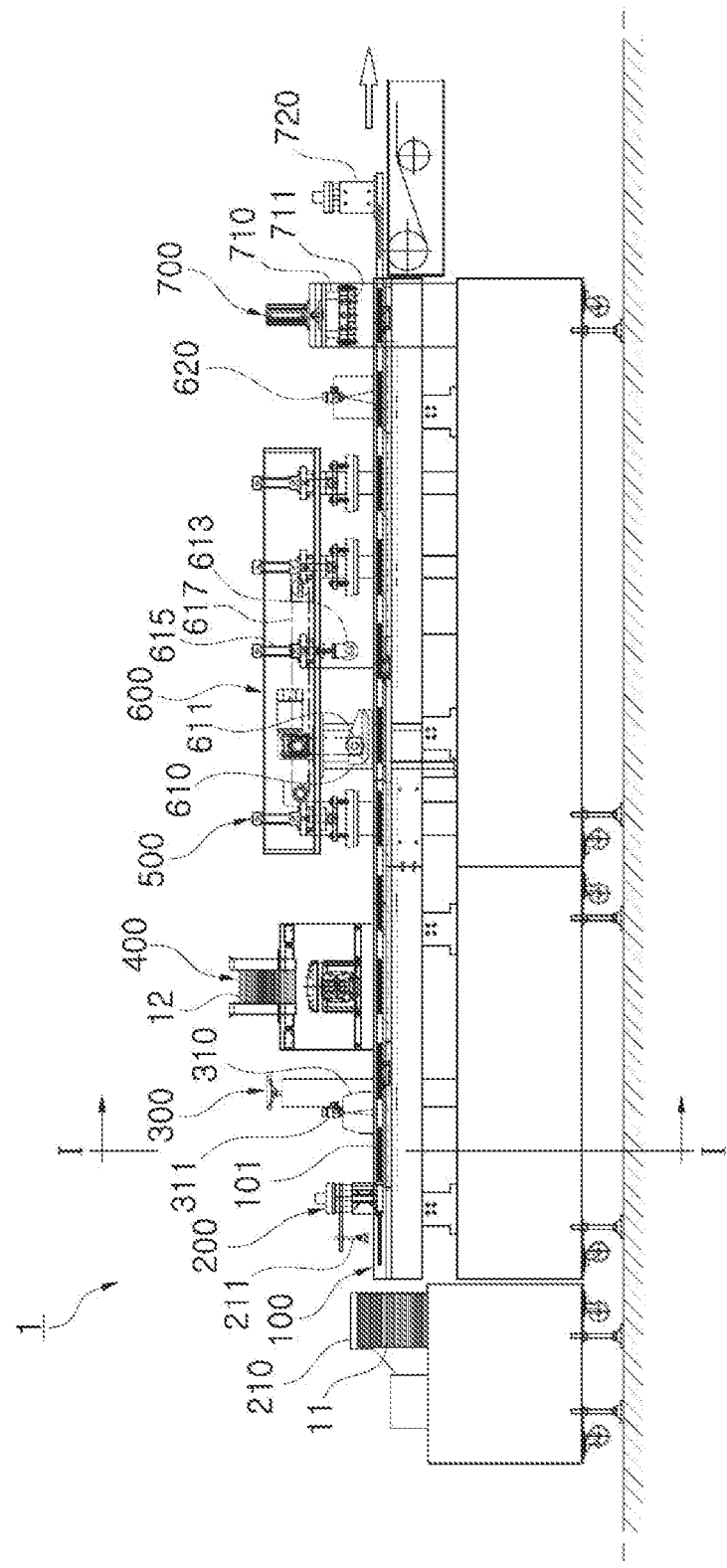

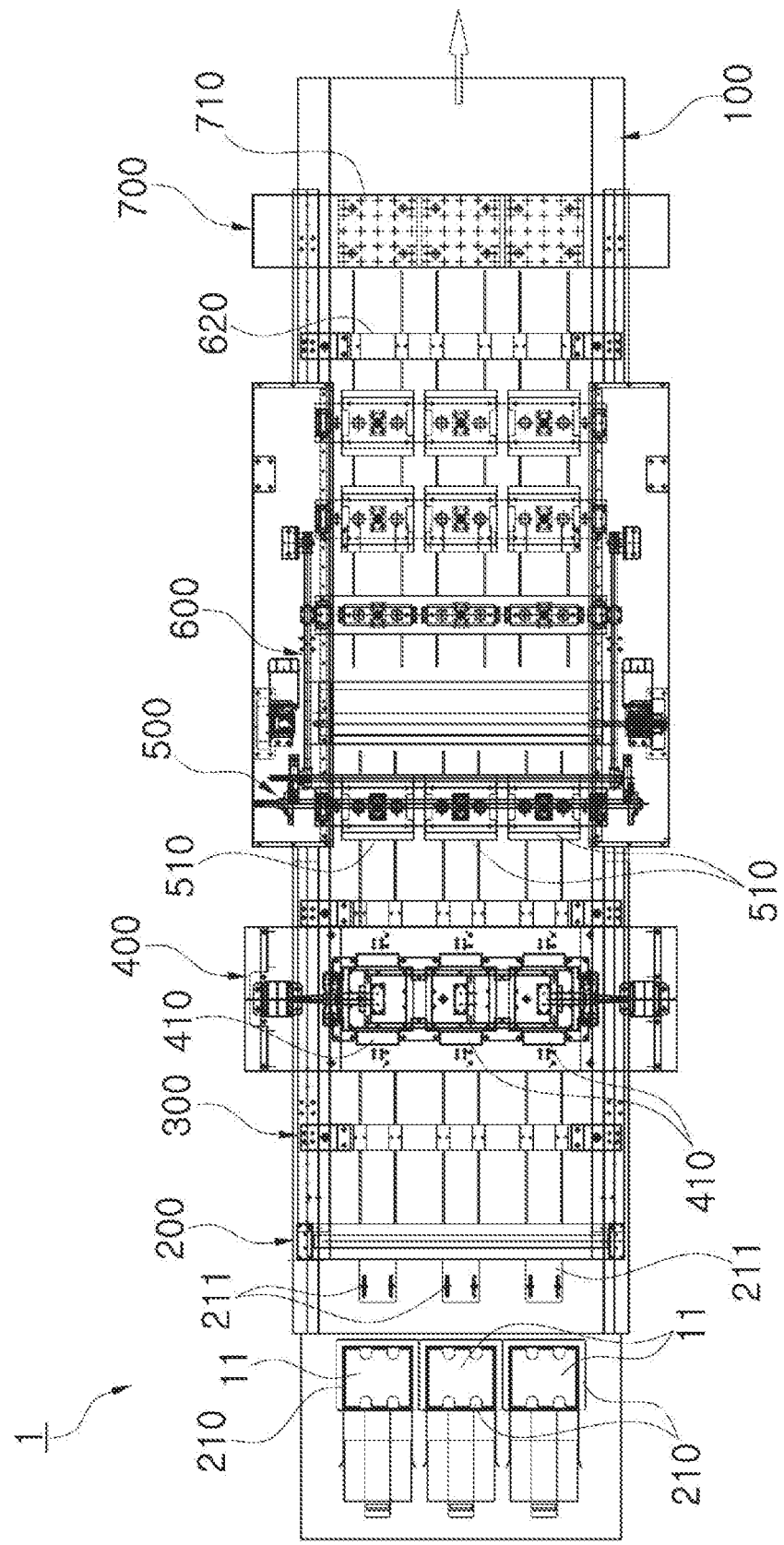
[Fig. 2]

[Fig. 3A]
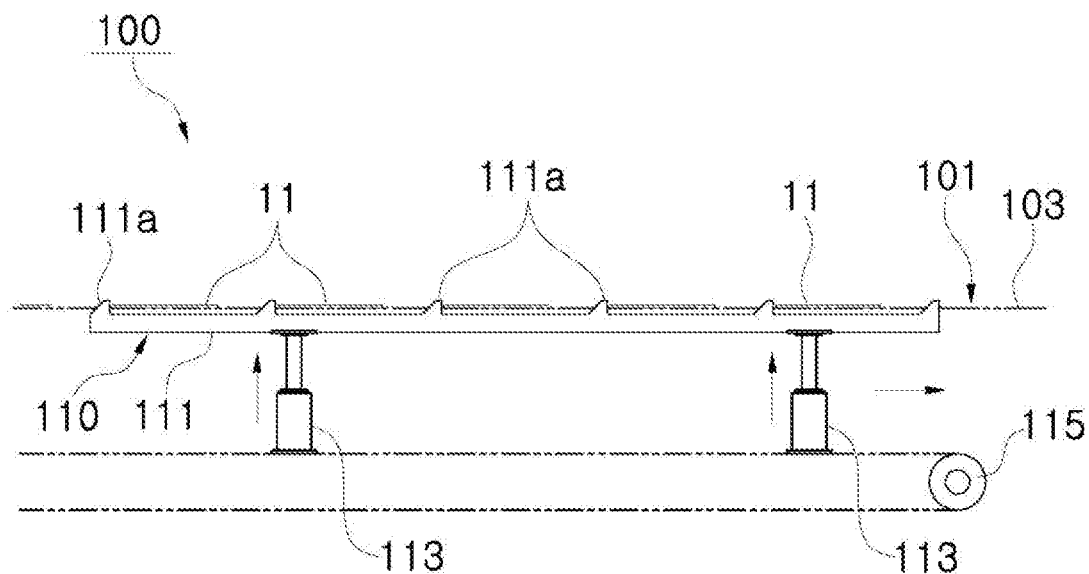
[Fig. 3B]
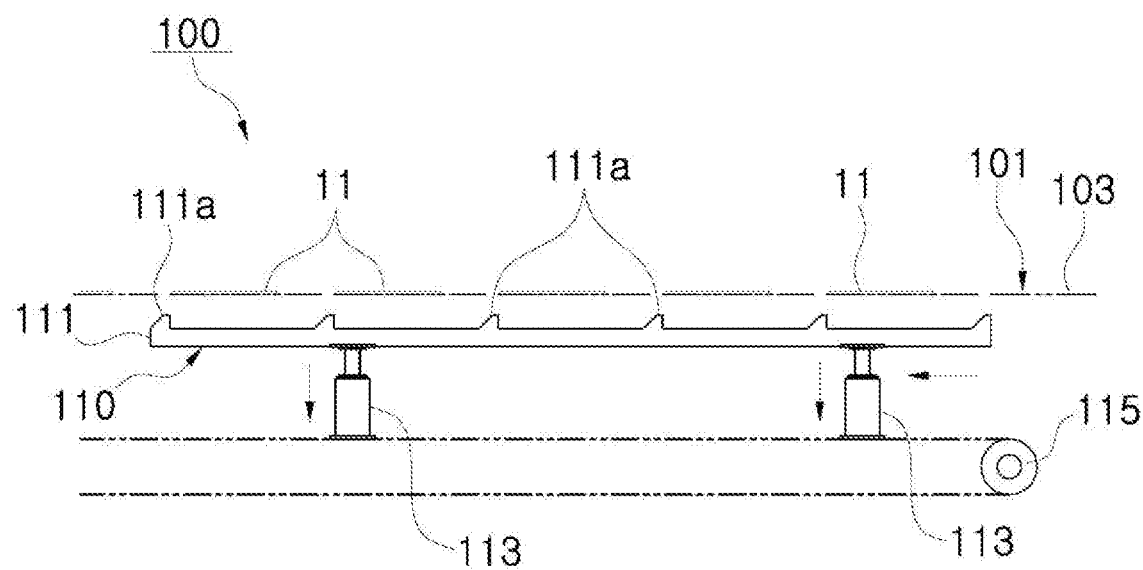

[Fig. 3C]
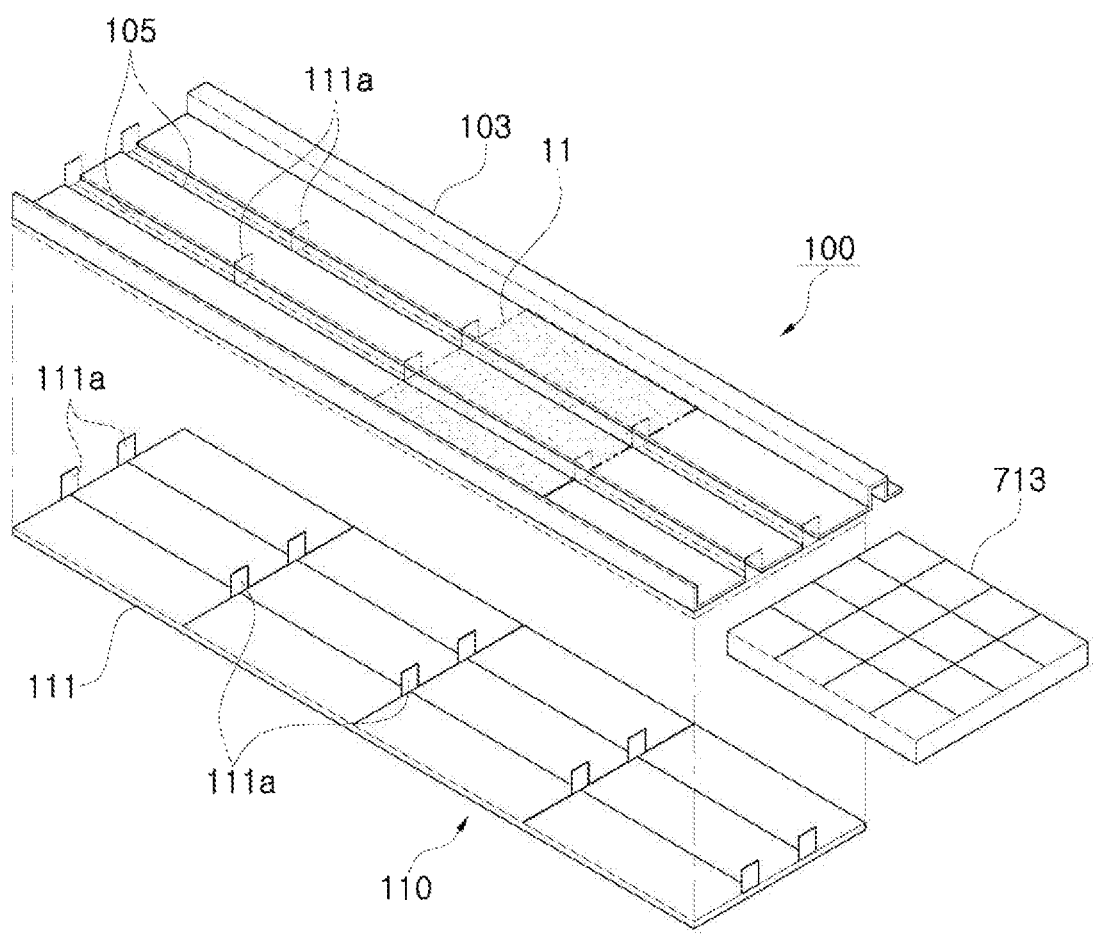

[Fig. 4]
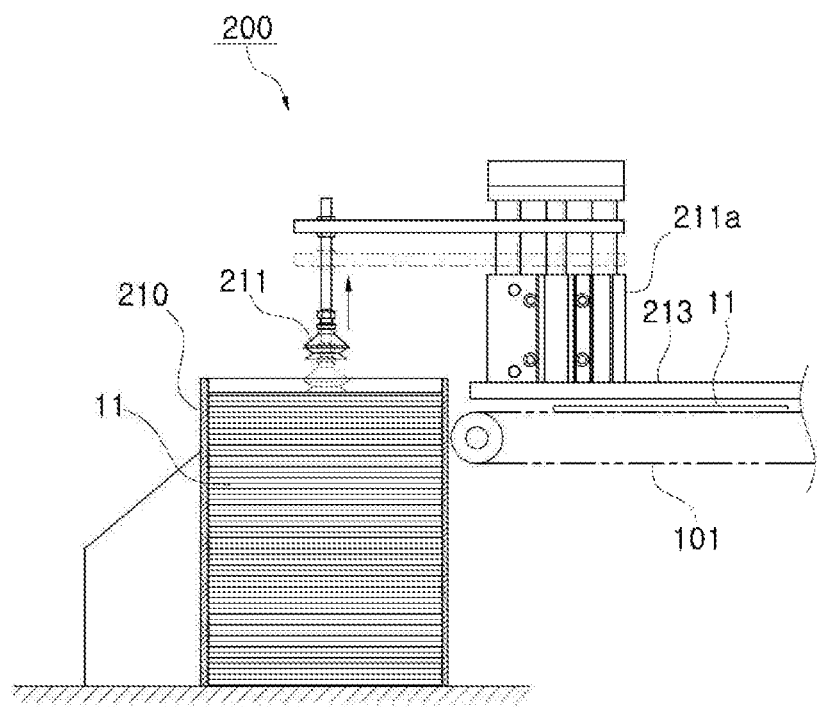

[Fig. 5]
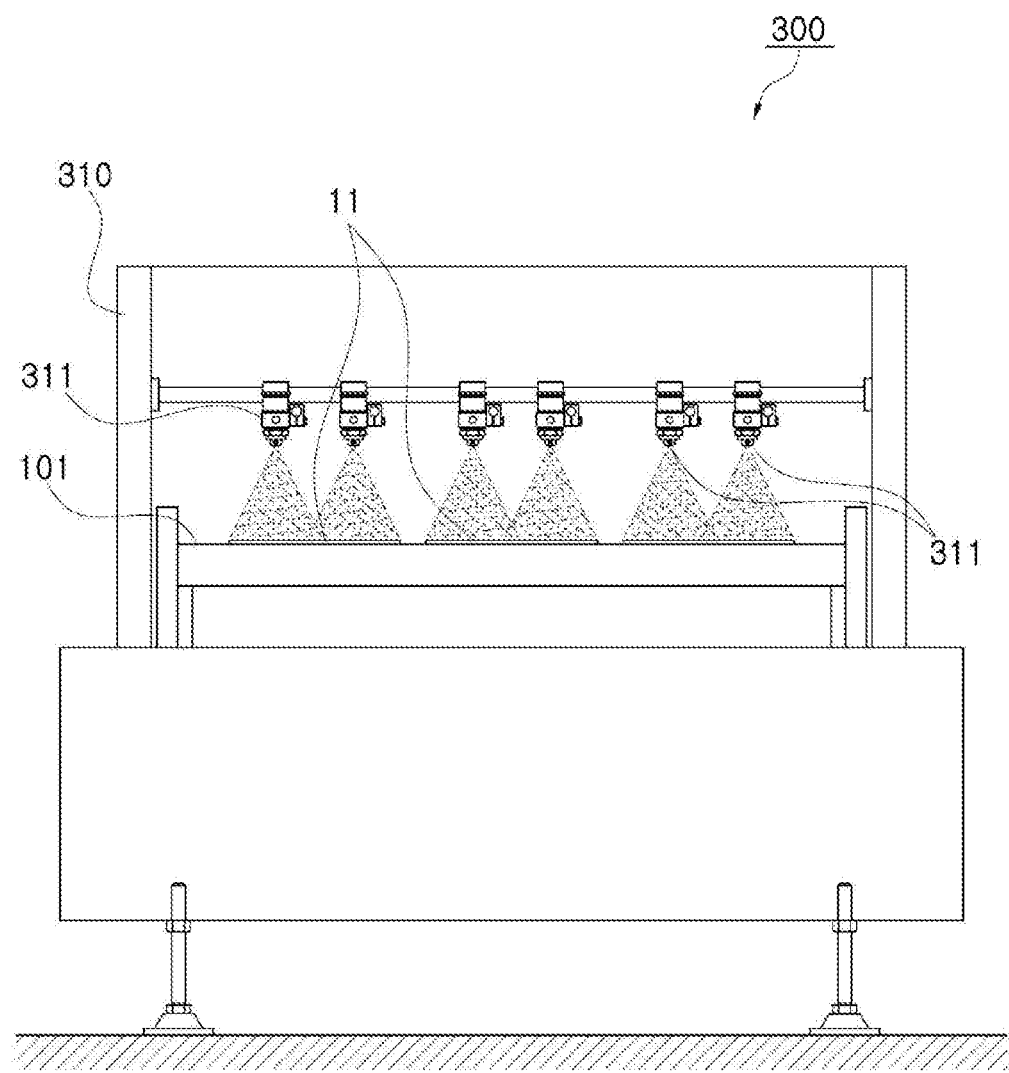

[Fig. 6A]
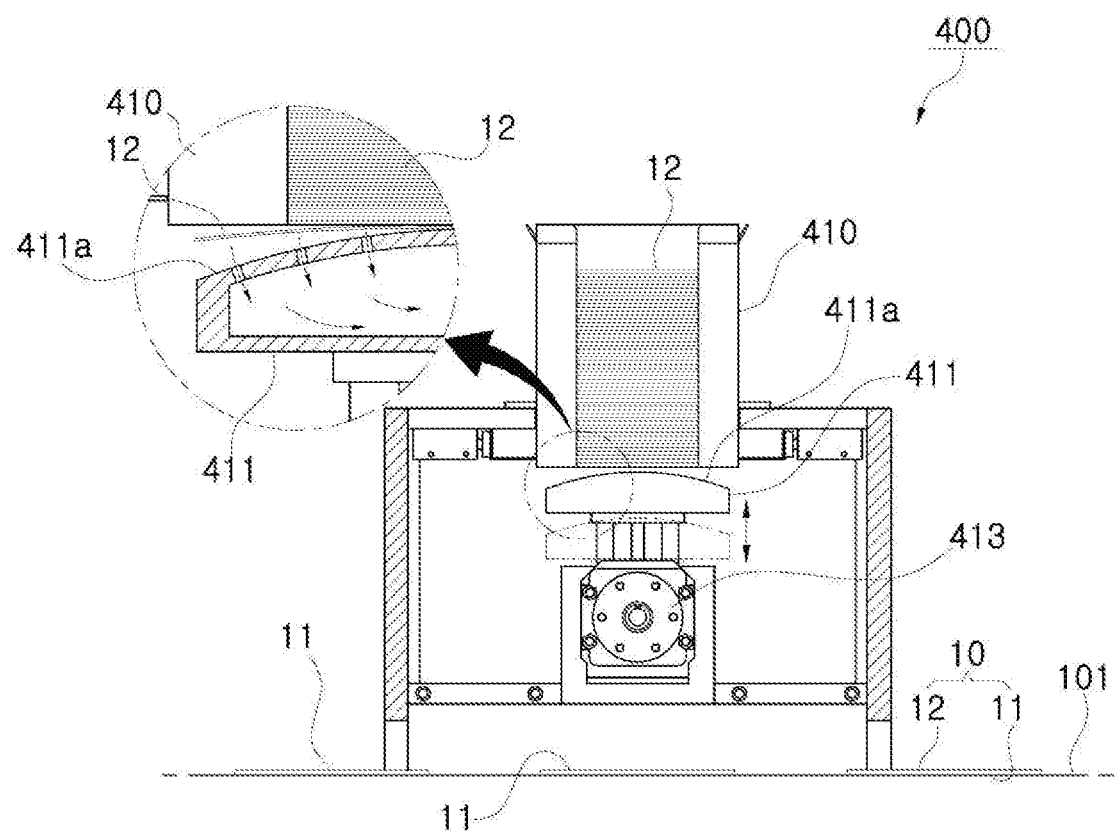

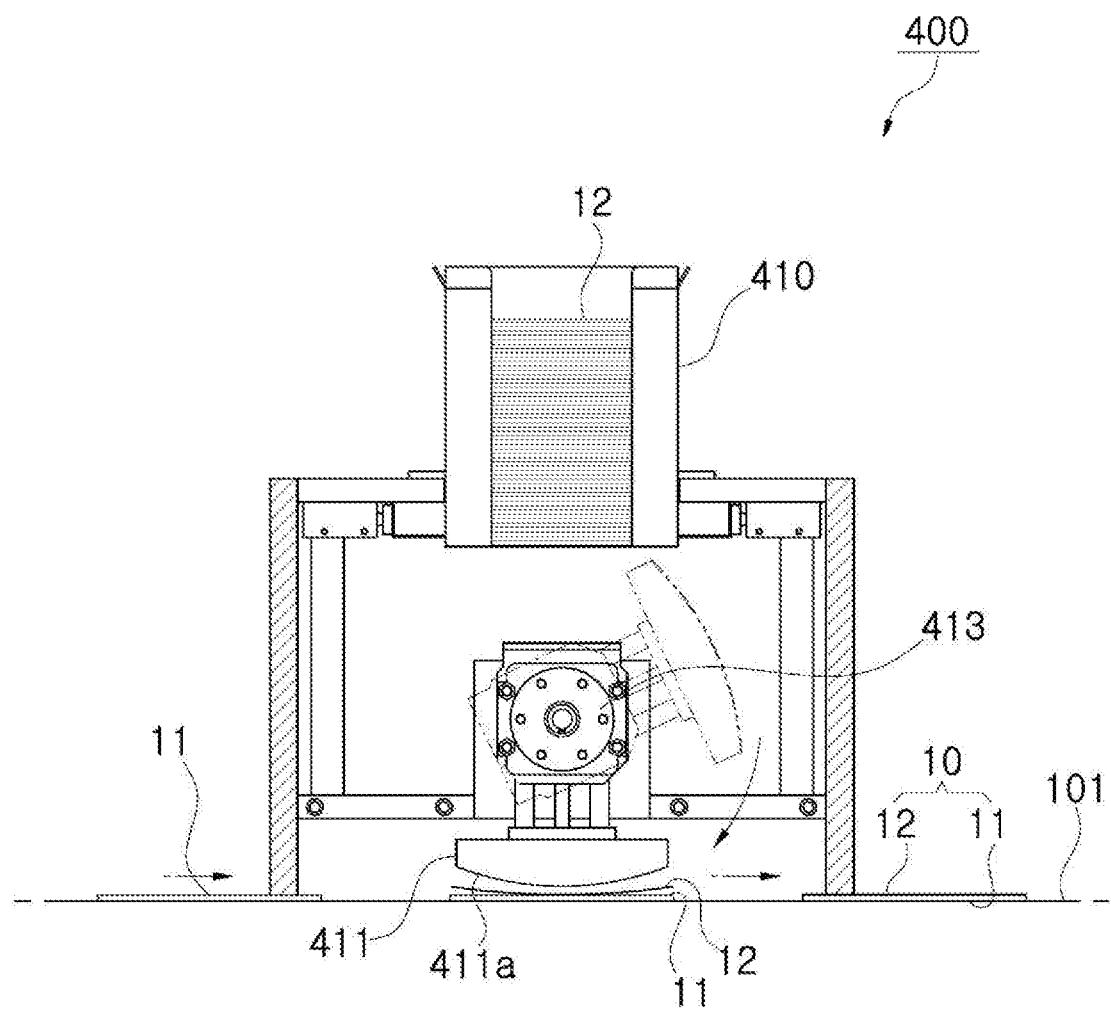
[Fig. 6B]

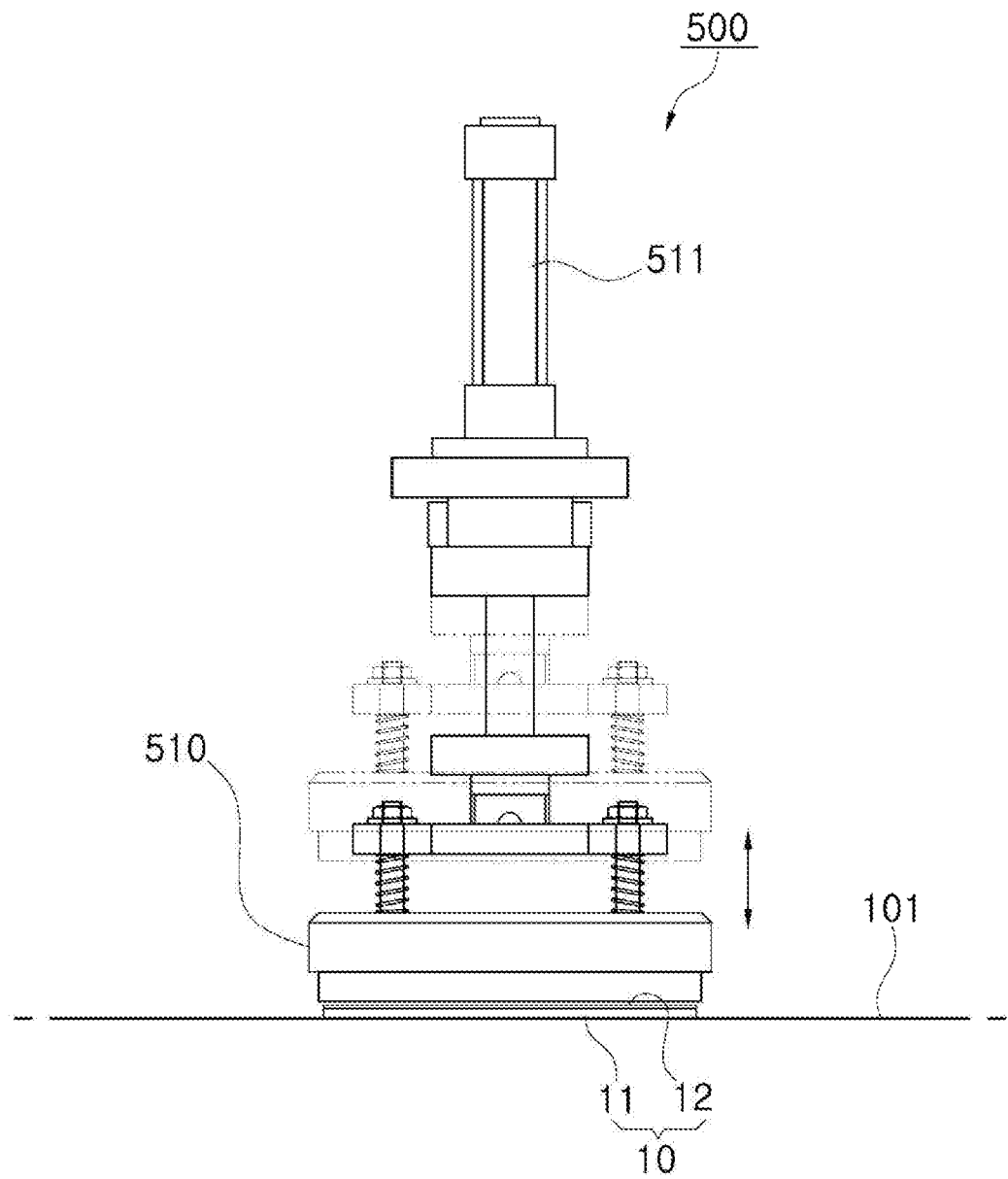
[Fig. 7]

[Fig. 8A]
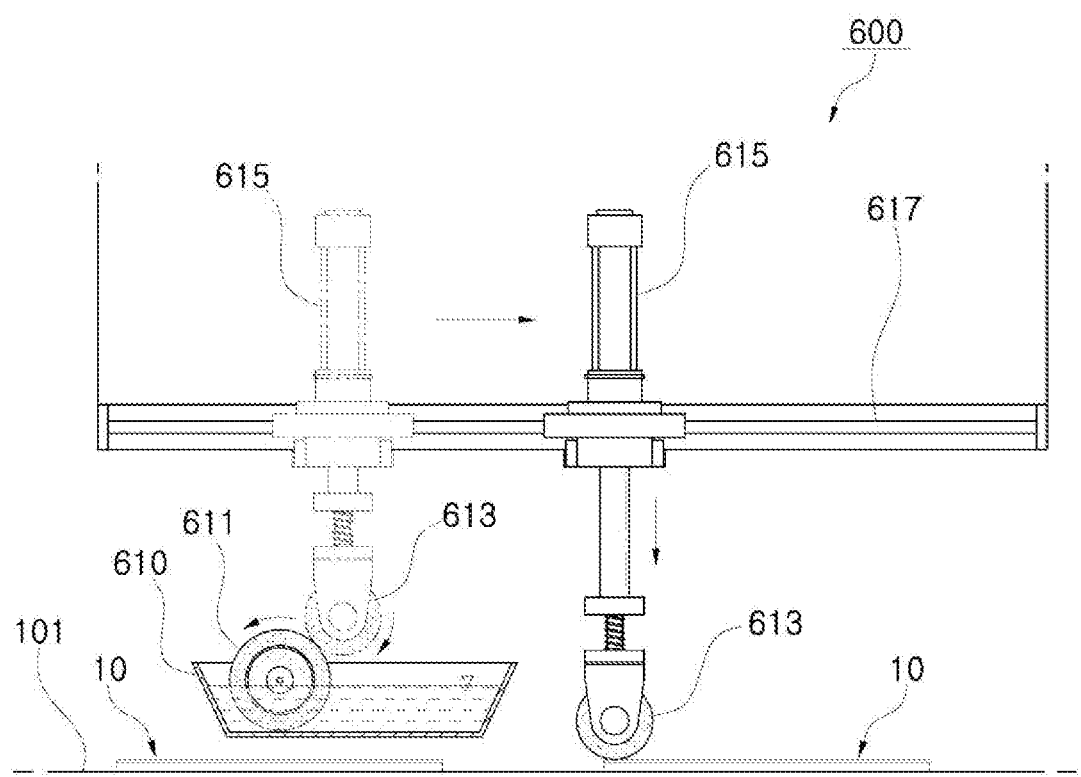

[Fig. 8B]
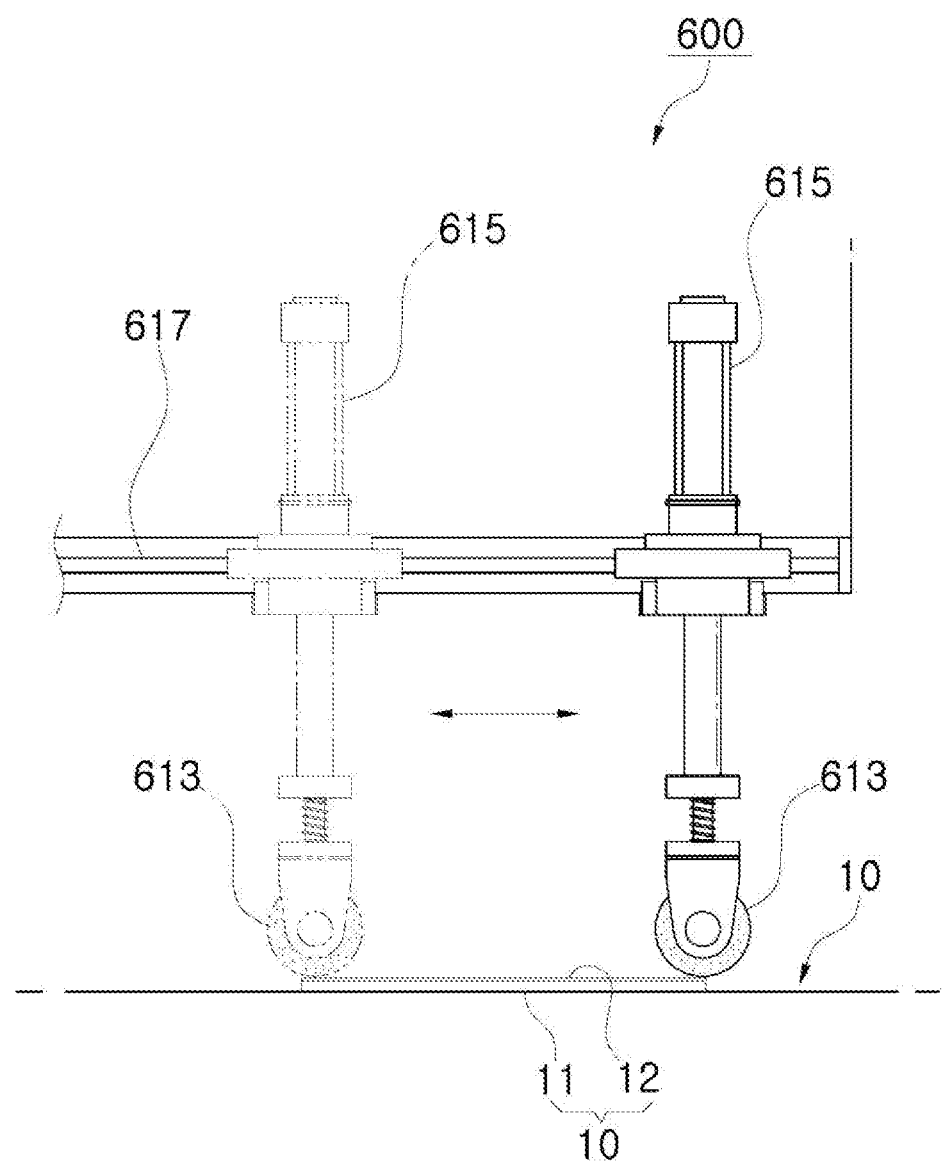

[Fig. 9]
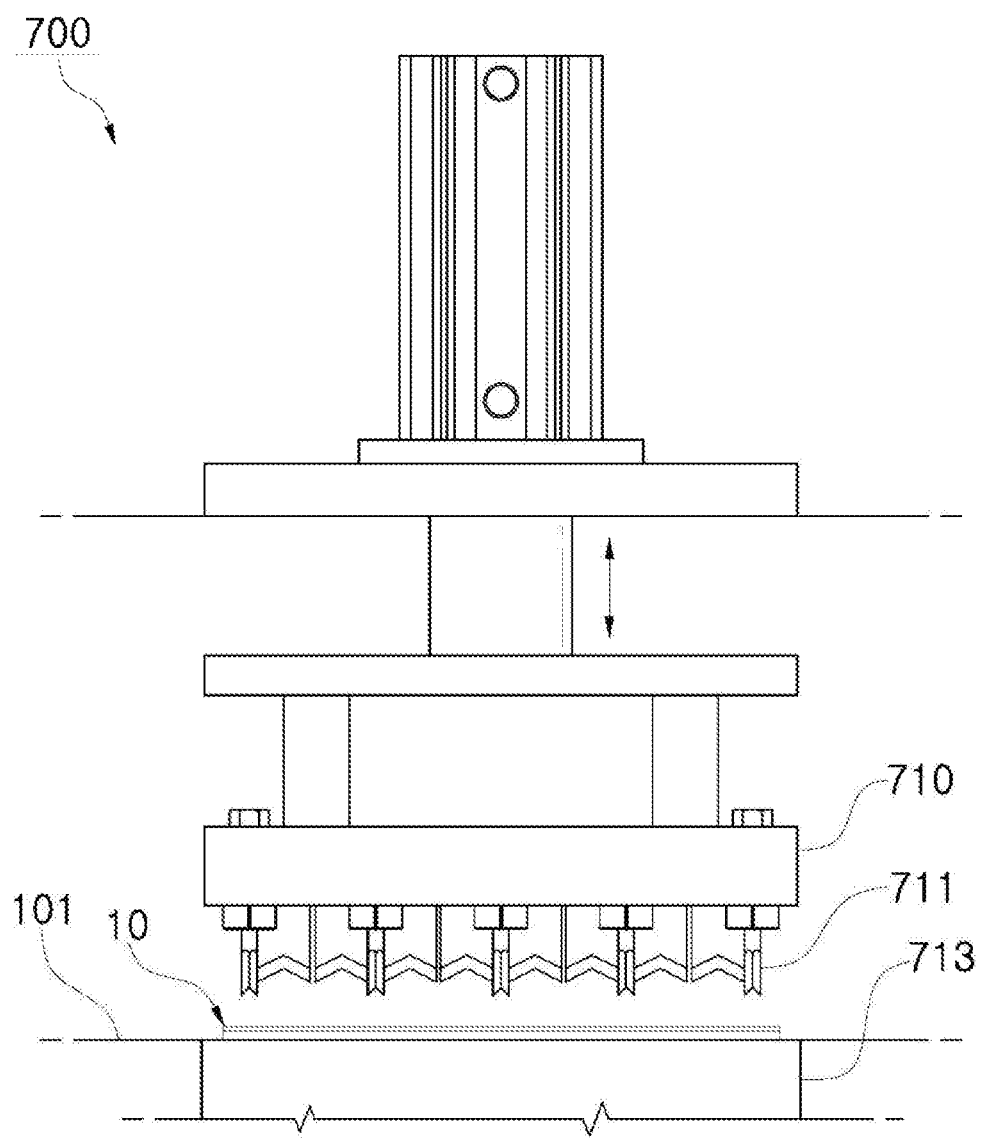

[Fig. 10A]
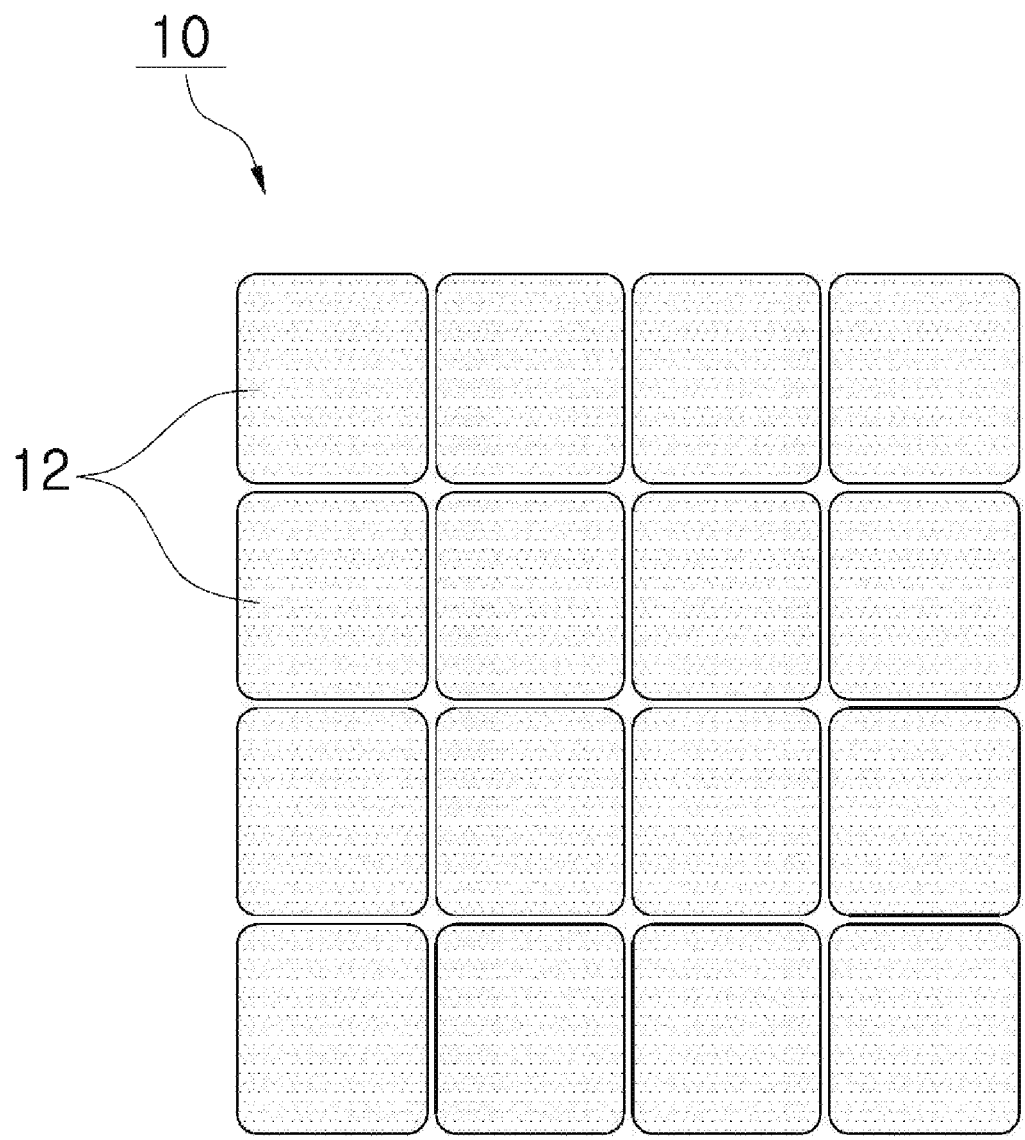

[Fig. 10B]
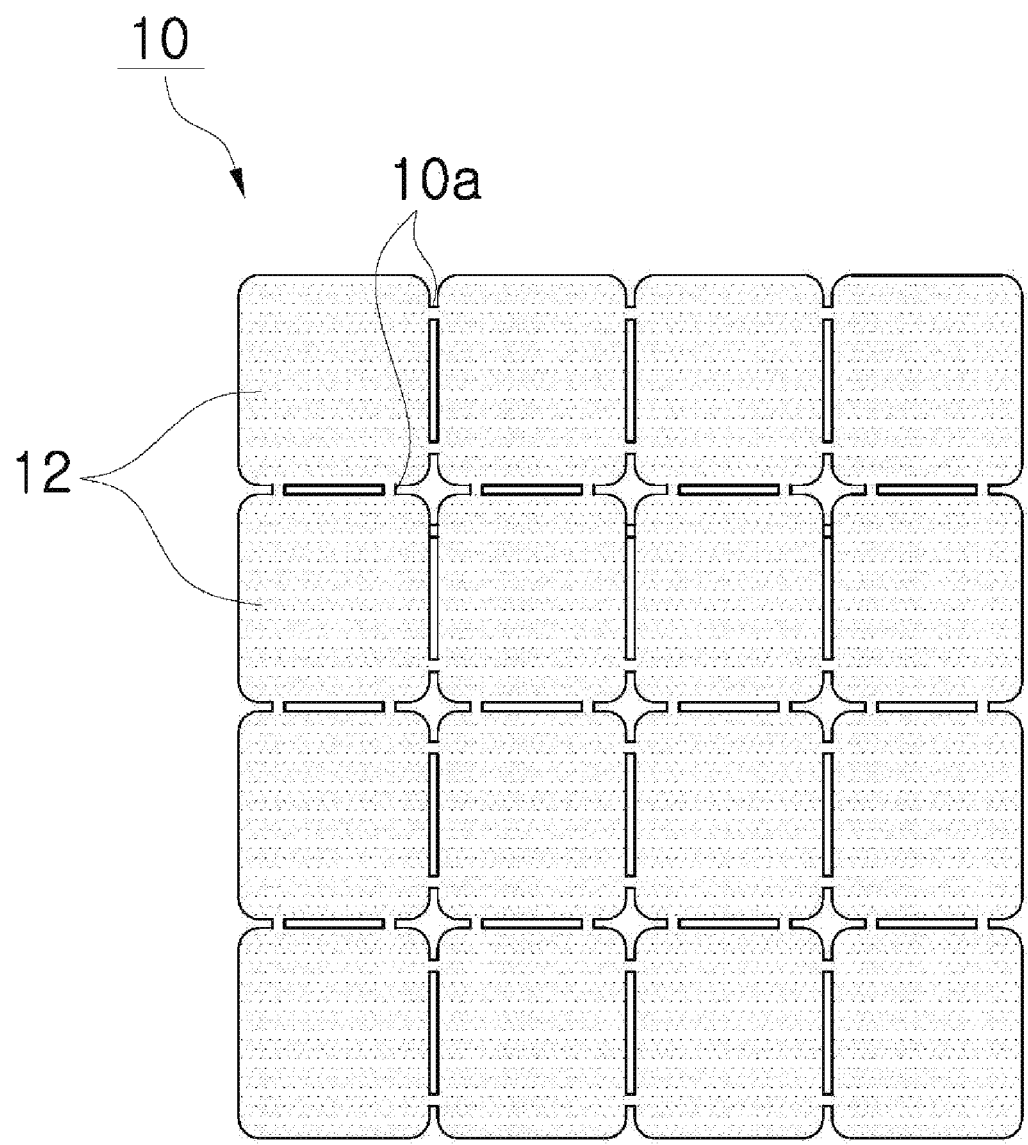

FOOD PROCESSING APPARATUS AND FOOD MANUFACTURING METHOD USING THE SAME

TECHNICAL FIELD

The present invention relates to a food processing apparatus and a food manufacturing method using the same, and more particularly, to a food processing apparatus and a food manufacturing method using the same that is capable of supplying two different kinds of food materials and sequentially performing manufacturing processes such as bonding and cutting, thus allowing food to be automatically processed.

BACKGROUND ART

Generally, Gim, dried seaweed, which is a kind of food, is baked with oil applied thereto and provided together with steamed rice or to a form of seaweed-wrapped rice rolls.

Further, dried fruits, seeds, dried beef, dried fish and the like are attached to the space between seaweed sheets or to one surface of the seaweed sheet and provided as one product in such a manner as to be easily eaten. The product is called seaweed snack (or fried seaweed chip). Such conventional seaweed product is disclosed in Korean Patent Registration No. 10-0357737 (dated on Oct. 25, 2002).

According to the conventional seaweed product, however, the seaweed sheet is very thin so that it can be easily damaged or broken during processing. As a result, the conventional seaweed product is made through a manual operation.

When the seaweed products are made through the manual operation, accordingly, the production efficiency and price competitiveness are all reduced, and besides, the qualities of products are not uniform.

DISCLOSURE

Technical Problem

Accordingly, the present invention has been made in view of the above-mentioned problems occurring in the prior art, and it is an object of the present invention to provide a food processing apparatus and a food manufacturing method using the same that is capable of supplying two different kinds of food materials, for example, a grain sheet (hereinafter, referred to as a first material) and Gim, dried seaweed (hereinafter, referred to as a second material) laid on top of the first material and sequentially performing manufacturing processes such as bonding and cutting on the single apparatus, thus allowing food to be easily processed.

Technical Solution

To accomplish the above-mentioned object, according to a first aspect of the present invention, there is provided a food processing apparatus including: a conveying part for receiving power to convey a material in one direction; a first material supply part located at the start of the conveying part to draw and load first materials laminated in a first container to the conveying part; a bonding liquid application part spaced apart from the first material supply part in an advancing direction of the conveying part to apply a bonding liquid to the top surfaces of the first materials conveyed from the first material supply part; a second material supply part adapted to draw and attach second materials laminated in a second container to the top surfaces of the first materials to which the bonding liquid is applied to form bonded materials; a bonding part adapted to pressurize the top surfaces of the bonded materials to uniformly bond the first materials and the second materials; an oil application part having an oil application member adapted to apply oil to the top surfaces of the bonded materials; and a cutting part adapted to cut each bonded material to a plurality of pieces through the pressurization of a cutting press having a plurality of cutting knives.

According to the present invention, preferably, the conveying part includes: a plurality of conveyors spaced apart from each other; and a laker unit located under the plurality of conveyors to convey the material by a given distance in the advancing direction of the conveying part, the laker unit comprising: a conveying plate having a plurality of protrusions protrudingly spaced apart from each other from the top surface thereof to convey the material; elevating actuators adapted to operate the conveying plate up and down; and a horizontal moving module adapted to slidingly reciprocate the conveying plate elevated by means of the elevating actuators in the advancing direction of the conveying part.

According to the present invention, preferably, the first material supply part includes: the first container having an internal space for laminating the first materials; and a first adsorption member adapted to adsorb and draw the first materials from the first container through vacuum and to load the drawn first materials to the conveying part.

According to the present invention, preferably, the bonding liquid application part includes: support rods located in a perpendicular direction to the conveying direction of the conveying part; and a plurality of injection nozzles spaced apart from each other on the support rods to inject the bonding liquid into the first materials.

According to the present invention, preferably, the second material supply part includes: the second container spaced apart from top of the conveying part and having an internal space for laminating the second materials; a second adsorption member adapted to adsorb and draw the second materials from the second container through vacuum and to supply the drawn second materials to the top surfaces of the first materials; and a rotary actuator adapted to rotate the second adsorption member up and down to attach the second materials to the top surfaces of the first materials arranged on the conveying part.

According to the present invention, preferably, the second adsorption member has an arch-shaped adsorption surface coming into contact with the second materials.

According to the present invention, preferably, the bonding part includes a pressurizing member adapted to pressurize the top surfaces of the bonded materials, and the pressurizing member is a press operating up and down by means of an actuator or a pressurizing roller.

According to the present invention, preferably, the oil application part includes: an oil container for containing oil thereinto; a rotating roller rotatably located in the oil container in such a manner as to allow at least a portion thereof to be submerged into the oil contained in the oil container; the roller type of oil application member selectively coming into rolling contact with the rotating roller to transfer the oil applied to the outer peripheral surface of the rotating roller thereto; and a conveying module adapted to move the oil application member to allow the oil application member to which the oil is transferred to be located on the top surfaces of the bonded materials.

According to the present invention, preferably, the cutting knives of the cutting part are assembled to a form of a lattice and take a given shape so that the four corners of the cut pieces of each bonded material are rounded.

According to the present invention, preferably, the bonded materials cut through the cutting part are conveyed and discharged through an adsorption module adapted to adsorb and convey the bonded materials through vacuum.

According to the present invention, preferably, the food processing apparatus further includes a steam injection part adapted to inject steam into the bonded materials before the bonded materials are cut to increase the humidity of the bonded materials.

According to the present invention, preferably, the first materials are grain sheets and the second materials are dried seaweed.

To accomplish the above-mentioned object, according to a second aspect of the present invention, there is provided a food manufacturing method including the steps of: receiving at least one first material from a first material supply part and conveying the first material to a conveying part; applying a bonding liquid to the first material disposed on the conveying part by means of injection nozzles; receiving a second material having the same area as the first material from a second material supply part and placing the second material on the top surface of the first material; pressurizing the top surface of the second material to bond the first material and the second material uniformly to form a bonded material; applying oil to at least one surface of the bonded material by means of an oil application member; and cutting the bonded material to which the oil is applied to a plurality of pieces through a cutting press having a plurality of cutting knives or cutting the bonded material to a plurality of segmented pieces connected to each other by means of connection portions.

According to the present invention, preferably, before the cutting, steam is injected into the bonded material to increase the humidity of the bonded material, and after the cutting, the plurality of cut pieces or segmented pieces is subjected to baking and seasoning processes in any order.

According to the present invention, preferably, the first materials are grain sheets and the second materials are dried seaweed.

Advantageous Effects

According to the present invention, the food processing apparatus and the food manufacturing method using the same are capable of supplying two different kinds of food materials and sequentially performing manufacturing processes such as bonding between the two different kinds of food materials and cutting the bonded material to a given size on the single apparatus, so that the food can be easily processed within a short period of time, thus improving the production efficiency of the apparatus.

DESCRIPTION OF DRAWINGS

FIG. 1 is a side view showing a configuration of a food processing apparatus according to the present invention.

FIG. 2 is a plan view of the food processing apparatus of FIG. 1.

FIGS. 3a to 3c are side and perspective views showing a laker unit of a conveying part of the food processing apparatus according to the present invention and the operating state of the laker unit.

FIG. 4 is a side view showing a first material supply part of the food processing apparatus according to the present invention.

FIG. 5 is a sectional view taken along the line I-I of FIG. 1, which shows a bonding liquid application part of the food processing apparatus according to the present invention.

FIGS. 6a and 6b are side views showing the operating state of a second material supply part of the food processing apparatus according to the present invention.

FIG. 7 is a side view showing a bonding part of the food processing apparatus according to the present invention.

FIGS. 8a and 8b are side views showing the operating state of an oil application part of the food processing apparatus according to the present invention.

FIG. 9 is a side view showing a cutting part of the food processing apparatus according to the present invention.

FIGS. 10a and 10b are top views showing various examples of the bonded material cut to a plurality of pieces through the cutting part of the food processing apparatus according to the present invention.

DETAILED DESCRIPTION OF MAIN ELEMENTS

1: food processing apparatus 10: bonded material
11: first material 12: second material
100: conveying part 101: conveyor
103: upper plate 105: guide rails
110: laker unit 111: conveying plate
111a: protrusions 113: elevating actuators
115: horizontal moving module 200: first material supply part
210: first container 211: first adsorption member
213: conveying member 300: bonding liquid application part
310: support rods 311: injection nozzles
400: second material supply part 410: second container
411: second adsorption member 411a: adsorption surface
413: rotary actuator 500: bonding part
510: pressurizing member 600: oil application part
610: oil container 611: rotating roller
613: oil application member 615: vertical actuator
617: conveying module 620: steam injection part
700: cutting part 710: cutting press
711: cutting knives 720: adsorption module

MODE FOR INVENTION

Hereinafter, an explanation on a food processing apparatus and a food manufacturing method using the same according to the present invention will be in detail given with reference to the attached drawing.

In order to facilitate the general understanding of the present invention in describing the present invention, through the accompanying drawings, the same reference numerals will be used to describe the same components and an overlapped description of the same components will be omitted.

FIG. 1 is a side view showing a configuration of a food processing apparatus according to the present invention, and FIG. 2 is a plan view of the food processing apparatus of FIG. 1.

Referring to FIGS. 1 and 2, a food processing apparatus 1 according to the present invention largely includes a conveying part 100, a first material supply part 200, a bonding liquid application part 300, a second material supply part 400, a bonding part 500, an oil application part 600 and a cutting part 700.

Now, an explanation on the configuration of the food processing apparatus 1 according to the present invention will be in detail given.

First, the conveying part 100 is located on top of a body of the food processing apparatus 1 according to the present invention and includes a conveyor 101 operating in one direction with the power received thereto. In this case, the conveyor 101 takes a shape of an upper plate 103 (See FIG. 3C) adapted to support a product so that the product can slip along the upper plate 103.

As shown in FIGS. 3a to 3c, the conveying part 100 includes a laker unit 110 in which a material is conveyed by a given distance on the upper plate 103 in an advancing direction of the conveying part 100 with the repetition of a given cycle (for example, the order of forward, downward, backward and upward movements), so that the material can be located at an accurate processing position. The laker unit 110 is disposed on guide rails 105 formed on the upper plate 103 in such a manner as to operate in the advancing direction of the conveying part 100. According to the present invention, for example, the conveying part 100 having the laker unit 110 will be described.

In more detail, the laker unit 110 includes a conveying plate 111, elevating actuators 113, and a horizontal moving module 115. The conveying plate 111 has a plurality of protrusions 111a protrudingly spaced apart from each other in the conveying direction of the material to convey the material, and the elevating actuators 113 serve to operate the conveying plate 111 up and down. Further, the horizontal moving module 115 serves to slidingly reciprocate the conveying plate 111 elevated by means of the elevating actuators 113 in the advancing direction of the conveying part 100.

Referring to the detailed operation of the laker unit 110, the horizontal moving module 115 moves in the advancing direction of the conveying part 100 in the state where the conveying plate 111 is raised by means of the elevating actuators 113, so that a first material 11 moves by means of the plurality of protrusions 111a formed on the conveying plate 111, together with the horizontal moving module 115 (which is the forward movement). At this time, the conveyor 101 has a plurality of belts spaced apart from each other, and the plurality of protrusions 111a protrudes from the plane of the conveyor 101 through the space between the plurality of belts. If conveying of the first material 11 to a given position is finished, the elevating actuators 113 move downward, and accordingly, the conveying plate 111 moves downward (which is the downward movement). If the conveying plate 111 is descended, the plurality of protrusions 111a protruding from the plane of the conveyor 101 moves downward from the plane of the conveyor 101, thus giving no influence on the operation performed on top of the conveyor 101. While the operation is being performed on top of the conveyor 101, the horizontal moving module 115 moves in the opposite direction to the advancing direction of the conveying part 100 (which is the backward movement), and next, the conveying plate 111 is ascended by means of the elevating actuators 113 to convey the first material 11 again.

In this case, the horizontal moving module 115 has a belting element operated by receiving the power of a motor. Further, a plurality of laker units 110 is spaced apart from each other in the longitudinal direction of the conveying part 100.

As shown in FIG. 4, the first material supply part 200 is located at the start of the conveying part 100 and serves to load the plurality of first materials 11 to the conveyor 101 at least one by one. At this time, the first materials 11 are conveyed by means of a first adsorption member 211.

In more detail, the first material supply part 200 includes a first container 210, the first adsorption member 211 and a conveying member 213. The first container 210 has a space for laminating the plurality of first materials 11 therein in such a manner as to be open on at least top or underside thereof. The first adsorption member 211 operates up and down by means of an actuator 211a, and it serves to adsorb and draw the first materials 11 laminated in the first container 210 by means of vacuum from the open portion of the first container 210. The conveying member 213 is located slidingly reciprocated on the guide rails (not shown in this figure) disposed in the longitudinal direction of the conveyor 101 through the power received thereto so that the first materials 11 adsorbed by means of the first adsorption member 211 can be loaded to the conveyor 101. The first container 210 is supplied from a material containing part (not shown) in which a plurality of first containers 210 having the plurality of first materials 11 is located, and after the first materials 11 contained in the first container 210 located on the first material supply part 200 are all consumed, another first container 210 in which the first materials 11 are contained is automatically supplied from the material containing part.

The first materials 11 used in the present invention could be grain sheets. The grain sheets have arbitrary shapes and made by mixing starch and water or by mixing grain powder and water. For example, the grain powder is made by mixing white rice, brown rice, black rice, red rice, green rice, and sweet rice, but it is not limited thereto. The starch includes at least one of potato starch, sweet potato starch, tapioca starch, corn starch, and rice starch, but it is not limited thereto. The grain sheet is made through the gelatinization of starch (if the starch is heated after water is applied to the starch, it swells and increases in viscosity so that it becomes semi-transparent uniform colloids) and then through the stretching and drying of the gelatinized starch. Accordingly, the grain sheet is low in thickness so that it can be easily damaged and broken when moved and supplied. So as to remove the above problems, according to the present invention, the grain sheets are adsorbed from the top of the first container 210, and further, an ambient temperature and moisture are raised through the supply of steam, thus preventing the grain sheets from being damaged and broken.

If the grain sheets as the first materials 11 are exposed to outside air for a given period of time, for example, for about 30 seconds or more, the grain sheets may be drastically bent according to the characteristics of the materials. In this case, the first materials 11 should be supplied within the shortest time possible so as to prevent their bending.

According to the present invention, in this case, the first adsorption member 211 of the first material supply part 200 adsorbs and draws the first materials 11 from the open top of the first container 210, of course, it is not limited thereto. The first adsorption member 211 may be elevated through the open underside of the first container 210 to load the first materials 11 to the conveyor 101 (which is not shown in the drawing). In this case, the first adsorption member 211 is located at the space between a plurality of segmented conveyors 101 when viewed in plane, thus preventing the conveyor 101 and the first adsorption member 211 from interfering with each other.

As shown in FIG. 5, the bonding liquid application part 300 is spaced apart from the first material supply part 200 in the advancing direction of the conveying part 100 and serves to apply a bonding liquid to the top surfaces of the first materials 11 supplied and conveyed from the first material supply part 200.

In more detail, the bonding liquid application part 300 includes support rods 310 and a plurality of injection nozzles 311. The support rods 310 are located just on the conveying part 100 in a perpendicular direction to the conveying direction of the conveyor 101, and the injection nozzles 311 are spaced apart from each other in the longitudinal directions of the support rods 310 to inject the bonding liquid into the first materials 11 conveyed along the conveyor 101.

The bonding liquid is evenly applied to the top surfaces of the first materials 11 so that the first materials 11 can come into contact with second materials 12 as will be discussed later. The bonding liquid is a mixture containing at least one of water, salt water, starch water, sugar liquid, and other additives, and of course, it is not limited thereto. That is, only if the bonding force between the first materials 11 and the second materials 12 is increased, the bonding liquid may be changed into various kinds of edible materials.

In this case, a static pressure of a supply tank (not shown) of the bonding liquid is desirably maintained to avoid the generation of deviation in the application of the bonding liquid. For example, the bonding liquid should be evenly applied so as to prevent the application deviation of more than 50% from being generated. Further, filters (not shown) are located on the inlet/outlet of the supply tank to prevent the bonding liquid from being contaminated. Furthermore, an agitator (not shown) is disposed in the interior of the supply tank to continuously agitate the bonding liquid.

The second material supply part 200 serves to one by one attach the second materials 12 to the top surfaces of the first materials 11 conveyed sequentially after the bonding liquid has been applied to the top surfaces of the first materials 11 through the bonding liquid application part 300. In this case, the second materials 12 are dried seaweed. At this time, the dried seaweed as the second materials 12 takes a shape of a sheet having the same size as the first materials 11. Further, the first materials 11 and the second materials 12 are desirably attached to each other in such a manner as to be laid on top of each other, without being deviated from each other.

In more detail, the second material supply part 400 includes a second container 410, a second adsorption member 411 and a rotary actuator 413.

As shown in FIGS. 6a and 6b, the second container 410 is spaced apart from top of the conveyor 101 and has a space for laminating the plurality of second materials 12 therein. The second adsorption member 411 operates up and down by means of an actuator 411a connected to the rotary actuator 413, and it serves to adsorb and draw the second materials 12 laminated in the second container 410 by means of vacuum from the open portion of the underside of the second container 410. The rotary actuator 413 serves to rotate the second adsorption member 411 so that the second materials 12 adsorbed by means of the second adsorption member 411 can be attached to the top surfaces of the first materials 11 conveyed along the conveyor 101.

If the second materials 12 are dried seaweed, they may have weak physical properties and also, they may be easily broken. Accordingly, the second materials 12 adsorbed and drawn from the second container 410 are turned by 180° by means of the rotary actuator 413, and next, the second materials 12 are attached to the first materials 11, thus minimizing the contact of the second materials 12 to the apparatus.

Further, the second adsorption member 411 has an arch-shaped adsorption surface 411a coming into contact with the second materials 12, and in more detail, the center of the second adsorption member 411 has a shape of a convex arch. The formation of the second adsorption member 411 having the arch-shaped adsorption surface 411a allows the second materials 12 to be drawn from the underside of the second container 410, without having any interference. In this case, the center of the second adsorption member 411 is the area extended toward arbitrary one direction from the intermediate portions of given edges of the adsorption surface 411a of the second adsorption member 411. Further, the formation of the arch-shaped adsorption surface 411a of the second adsorption member 411 prevents air pockets by which bonding uniformity is lowered from being formed.

As shown in FIG. 6b, the second materials 12 are adsorbed and drawn by means of the arch-shaped second adsorption member 411, and after the center of the second materials 12 is brought into contact with the center of the top surfaces of the first materials 11, the vacuum state is released. Accordingly, both sides of each second material 12 are naturally spread on the top surface of each first material 11 by means of its own weight, thus minimizing the formation of the air pockets.

The bonding part 500 serves to pressurize the top surfaces of bonded materials 10 made by laminating the first materials 11 and the second materials 12 on top of each other, thus providing uniform bonding results.

Referring to FIG. 7, the bonding part 500 includes a pressurizing member 510 adapted to pressurize the bonded materials 10, and the pressurizing member 510 is a press operating up and down by means of an actuator 511 or a pressurizing roller (not shown) adapted to pressurize the top surfaces of the bonded materials 10 through rolling contact. Only if the pressurizing member 510 serves to pressurize the bonded materials 10, of course, it may be not limited thereto. According to the present invention, for example, the press serving as the pressurizing member 510 is suggested.

Furthermore, bonding between the first materials 11 and the second materials 12 should be performed within a deviation of ±1 mm, and accordingly, it is necessary that the bonding part 50 is set to an appropriate force so as to prevent the first materials 11 and the second materials 12 from being deviated from each other upon bonding. According to the present invention, desirably, the pressure of the press of the bonding part 500 is appropriately determined in accordance with the conditions of the first materials 11 and the second materials 12 and the operating conditions.

According to the present invention, the bonding part 500 is located after the process of the second material supply part 400, but only if pressurizing and bonding of materials are needed, of course, the bonding part 500 may be selectively located between the processes.

The oil application part 600 serves to apply oil to the top surfaces of the bonded materials 10 supplied from the bonding part 500. After the oil has been applied to the bonded materials 10, that is, the bonded materials 10 are put in an oven and subjected to a baking process. Through the baking process, final products become flavored, and in the process of the oven, further, the combustion of the second materials 12, that is, the dried seaweed can be prevented.

Referring to FIG. 8a, the oil application part 600 includes an oil container 610, a rotating roller 611, an oil application member 613, a vertical actuator 615, and a conveying module 617. The oil container 610 contains oil thereinto, and the rotating roller 611 is rotatably located in the oil container 610 in such a manner as to allow at least a portion thereof to be submerged into the oil contained in the oil container 610. The oil application member 613 is a roller type of member coming into rolling contact with the rotating roller 611 so that the oil applied to the outer peripheral surface of the rotating roller 611 is transferred to the oil application member 613. The vertical actuator 615 moves the oil application member 613 up and down, and the conveying module 617 includes belting elements adapted to reciprocate the vertical actuator 615 along the horizontal longitudinal direction of the conveying part 100. As shown in FIG. 8b, the oil application member 613 to which the oil is transferred is located on the bonded materials 10 conveyed along the conveyor 101, thus performing the oil application process. Upon the oil application process, a given amount of oil should be evenly applied to the whole areas of the bonded materials 10, and for example, desirably, the oil is applied within a deviation of 50% or under.

At this time, the oil is made by mixing a variety of oil according to the characteristics of the product, and then, the mixed oil is kept and used in an oil tank (not shown). The oil tank may be agitated to prevent oil layers from being separated from each other while the oil is being kept therein.

According to the present invention, a steam injection part (See a reference numeral 620 in FIGS. 1 and 2) may be located between the oil application part 600 and the cutting part 700 as will be discussed later. The steam injection part 620 serves to inject steam into the bonded materials 10 before the bonded materials 10 are cut to increase the humidity of the bonded materials 10 so that the bonded materials 10 cannot be damaged or broken upon cutting. According to the present invention, in more detail, the steam injection part 620 is provided, and if necessary, the steam injection part 620 may be selectively turned on or off.

The cutting part 700 serves to cut the bonded materials 10 to which the oil is applied to a plurality of pieces through the pressurization of a cutting press 710 having a plurality of cutting knives 711. Referring to FIG. 9, the cutting knives 711 are assembled to a form of a lattice and take a given shape capable of allowing the four corners of the cut pieces of each bonded material 10 to be rounded. Of course, the shapes of the cutting knives 711 may be varied in accordance with desired shapes of the cut pieces of the bonded material 10. Upon the cutting process, the bonded material 10 is located on top of a cutting die 713.

The bonded materials 10 cut to the plurality of pieces through the cutting part 700 are conveyed and discharged through an adsorption module 720 (See FIG. 1) adapted to adsorb and convey the bonded materials 10 by means of vacuum. The adsorption module 720 has a similar mechanism to the first adsorption member 211, and accordingly, a detailed explanation on the adsorption module 720 will be avoided for the brevity of the description.

Next, an explanation on a food manufacturing method using the food processing apparatus according to the present invention will be given with reference to FIGS. 1 to 10.

First, the plurality of first materials 11 laminated in the first container 210 is loaded to the conveyor 101 through the first material supply part 200 (See FIG. 4), and the first materials 11 loaded to the conveyor 101 are conveyed to the bonding liquid application part 300 so that a given amount of bonding liquid is applied to the top surfaces of the first materials 11 (See FIG. 5). At this time, the bonding liquid is applied to allow the first materials 11 and the second materials 12 to gently come into contact with each other, and accordingly, the bonded liquid should be evenly applied so as to prevent the application deviation of more than 50% from being generated.

After the bonding liquid has been applied, the second materials 12 are attached to the top surfaces of the first materials 11 through the second material supply part 400, and the two layered first and second materials 11 and 12 are pressurized to each other through the bonding process of the bonding part 500 to provide the bonded materials 10 (See FIG. 7).

If the bonded material 10 having a given thickness is provided, oil is applied to the top surface of the bonded material 10 through the oil application part 600 (See FIGS. 8a and 8b), and the bonded material 10 to which the oil is applied is cut to a plurality of pieces having a given shape through the given cutting process of the cutting press 710 having the plurality of cutting knives 711 (See FIG. 9). After that, the bonded material 10 is conveyed and discharged through the adsorption module 720, for post-processes.

Before the cutting process, selectively, the humidity of the bonded material 10 is increased through the steam injection part 620 to prevent the bonded material 10 from being damaged and broken upon the cutting through the cutting press 710.

The bonded material 10 may be completely cut to the plurality of pieces through the cutting part 700 (See FIG. 10a), or the bonded material 10 may be partially cut to a plurality of pieces by means of connection portions 10a formed between the adjacent pieces, without being completely segmented (See FIG. 10b), so that it can be naturally separated in the post process, that is, the baking process in the oven. That is, the whole shape of the bonded material 10 after the cutting process of the cutting part 700 is maintained to the form of one body, thus allowing the bonded material 10 to be more easily conveyed for post processes.

Even if not shown in the drawing, furthermore, the bonded materials 10 after the cutting process are conveyed into the oven and subjected to the baking process. Next, a seasoning process is performed to increase priority and flavor of the product. For example, the baking process is performed to allow the bonded materials 10 to be baked in the oven to a temperature between 200 and 270° C., or an oven using superheated steam having a temperature between 150 and 380° C. The seasoning process serves to apply a variety of flavors to the bonded materials 10 in accordance with the kinds of seasonings. After the baking process, at this time, the seasoning process is performed, and otherwise, the baking process is performed after the seasoning process has been conducted.

Before the bonded materials 10 are conveyed from the cutting part 700 for the baking process, furthermore, a process for sorting defective products may be additionally performed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

According to the present invention, particularly, the first materials 11 are grain sheets and the second materials 12 are the dried seaweed. However, the present invention is not limited to the above-mentioned materials, and accordingly, the first materials 11 and the second materials 12 may be provided as a variety of materials.

The invention claimed is:
1. A food processing apparatus comprising:
a conveying part for receiving power to convey a material in one direction;

a first material supply part located at the start of the conveying part to draw and load first materials laminated in a first container to the conveying part;

a bonding liquid application part spaced apart from the first material supply part in an advancing direction of the conveying part to apply a bonding liquid to top surfaces of the first materials conveyed from the first material supply part;

a second material supply part adapted to draw and attach second materials laminated in a second container to the top surfaces of the first materials to which the bonding liquid is applied to form bonded materials;

a bonding part adapted to pressurize the top surfaces of the bonded materials to uniformly bond the first materials and the second materials;

an oil application part having an oil application member adapted to apply oil to the top surfaces of the bonded materials; and a cutting part adapted to cut each bonded material to a plurality of pieces through the pressurization of a cutting press having a plurality of cutting knives.

2. The food processing apparatus according to claim 1, wherein the conveying part comprises:

a plurality of conveyors spaced apart from each other; and a raker unit located under the plurality of conveyors to convey the material by a given distance in the advancing direction of the conveying part, the raker unit comprising:

a conveying plate having a plurality of protrusions protrudingly spaced apart from each other from a top surface thereof to convey the material;

elevating actuators adapted to operate the conveying plate up and down; and a horizontal moving module adapted to slidingly reciprocate the conveying plate elevated by means of the elevating actuators in the advancing direction of the conveying part.

3. The food processing apparatus according to claim 1, wherein the first material supply part comprises:

the first container having an internal space for laminating the first materials; and a first adsorption member adapted to adsorb and draw the first materials from the first container through vacuum and to load the drawn first materials to the conveying part.

4. The food processing apparatus according to claim 1, wherein the bonding liquid application part comprises:

support rods located in a perpendicular direction to the conveying direction of the conveying part; and a plurality of injection nozzles spaced apart from each other on the support rods to inject the bonding liquid into the first materials.

5. The food processing apparatus according to claim 1, wherein the second material supply part comprises:

the second container being spaced apart from and located above the conveying part and having an internal space for laminating the second materials;

a second adsorption member adapted to adsorb and draw the second materials from the second container through vacuum and to supply the drawn second materials to the top surfaces of the first materials; and a rotary actuator adapted to rotate the second adsorption member up and down to attach the second materials to the top surfaces of the first materials arranged on the conveying part.

6. The food processing apparatus according to claim 5, wherein the second adsorption member has an arch-shaped adsorption surface coming into contact with the second materials.

7. The food processing apparatus according to claim 1, wherein the bonding part comprises a pressurizing member adapted to pressurize the top surfaces of the bonded materials, and the pressurizing member is a press operating up and down by means of an actuator or a pressurizing roller.

8. The food processing apparatus according to claim 1, wherein the oil application part comprises:

an oil container for containing oil thereinto;

a rotating roller rotatably located in the oil container in such a manner as to allow at least a portion thereof to be submerged into the oil contained in the oil container;

the oil application member comprising a roller capable of selectively coming into rolling contact with the rotating roller to transfer the oil applied to the outer peripheral surface of the rotating roller thereto; and a conveying module adapted to move the oil application member to allow the oil application member to which the oil is transferred to be located on the top surfaces of the bonded materials.

9. The food processing apparatus according to claim 1, wherein the cutting knives of the cutting part are assembled to a form of a lattice and take a given shape so that the four corners of the cut pieces of each bonded material are rounded.

10. The food processing apparatus according to claim 1, wherein the bonded materials cut through the cutting part are conveyed and discharged through an adsorption module adapted to adsorb and convey the bonded materials through vacuum.

11. The food processing apparatus according to claim 1, further comprising a steam injector located between the oil application part and the cutting part, wherein the stream injector is adapted to inject steam into the bonded materials before the bonded materials are cut to increase the humidity of the bonded materials.

12. The food processing apparatus according to claim 1, wherein the first materials are grain sheets and the second materials are dried seaweed.

* * * * *